United States Patent
Grebowsky et al.

(10) Patent No.: US 6,177,835 B1
(45) Date of Patent: Jan. 23, 2001

(54) METHOD AND APPARATUS FOR HIGH DATA RATE DEMODULATION

(75) Inventors: Gerald J. Grebowsky, Lanham, MD (US); Andrew A. Gray; Meera Srinivasan, both of Pasadena, CA (US)

(73) Assignee: The United States of America as represented by the Administrator of the National Aeronautics and Space Administration, Washington, DC (US)

( * ) Notice: Under 35 U.S.C. 154(b), the term of this patent shall be extended for 0 days.

(21) Appl. No.: 09/363,883

(22) Filed: Jul. 30, 1999

Related U.S. Application Data

(60) Provisional application No. 60/094,953, filed on Jul. 31, 1998.

(51) Int. Cl.[7] .................................................. H03D 3/00
(52) U.S. Cl. ......................... 329/304; 329/306; 375/324
(58) Field of Search ................................ 329/304, 306, 329/307; 375/324, 326, 327, 329, 333, 332, 371, 373, 376, 340, 331

(56) References Cited

U.S. PATENT DOCUMENTS

| | | | |
|---|---|---|---|
| 5,325,401 | * 6/1994 | Halik et al. | 375/83 |
| 5,621,755 | 4/1997 | Bella et al. | |
| 5,636,246 | * 6/1997 | Tzannes et al. | 375/260 |
| 5,787,123 | * 7/1998 | Okada et al. | 375/324 |
| 6,058,145 | * 5/2000 | Komaki et al. | 375/324 |

OTHER PUBLICATIONS

Ramin Sadr, P.P. Vaidyanathan, Dan Raphaeli, Sam Hinedi, "Parallel Digital Modem Using Multirate Digital Filter Banks," JPL Publication 94–20, Aug. 15, 1994.

* cited by examiner

*Primary Examiner*—Robert Pascal
*Assistant Examiner*—Henry Choe

(57) ABSTRACT

A method to demodulate BPSK or QPSK data using clock rates for the receiver demodulator of one-fourth the data rate. This is accomplished through multirate digital signal processing techniques. The data is sampled with an analog-to-digital converter and then converted from a serial data stream to a parallel data stream. This signal processing requires a clock cycle four times the data rate. Once converted into a parallel data stream, the demodulation operations including complex baseband mixing, lowpass filtering, detection filtering, symbol-timing recovery, and carrier recovery are all accomplished at a rate one-fourth the data rate. The clock cycle required is one-sixteenth that required by a traditional serial receiver based on straight convolution. The high rate data demodulator will demodulate BPSK, QPSK, UQPSK, and DQPSK with data rates ranging from 10 Mega-symbols to more than 300 Mega-symbols per second. This method requires less clock cycles per symbol tan traditional serial convolution techniques.

40 Claims, 7 Drawing Sheets

METHOD AND APPARATUS FOR HIGH DATA RATE DEMODULATION

CROSS-REFERENCES TO RELATED APPLICATIONS

This application claims priority from co-pending U.S. Provisional Patent Application Ser. No. 60/094,953 filed on Jul. 31, 1998, which is incorporated herein by reference for all it discloses.

ORIGIN OF INVENTION

The invention described herein was made in the performance of work under a NASA contract and by an employee of the United States Government, and is subject to Public Law 96-517 (35 U.S.C. § 200 et seq.). The contractor has not elected to retain title to the invention.

TECHNICAL FIELD

This invention is directed to a digital receiver that receives high rate data modulated by different techniques. The digital receiver uses discrete Fourier transforms to convert modulated data from the time domain to the frequency domain. The present invention implements frequency domain detection filtering and symbol timing correction. The invention uses inverse discrete Fourier transforms to convert the modulated data back into the time domain.

BACKGROUND

The only true limitation to the data rates that an all-digital receiver can process is the analog-to-digital converter (A/D). Conventional CMOS digital receivers have substantially lower clock rates than the fastest commercially available analog-to-digital converters. In such a high rate system, the minimum number of samples required for digital processing (i.e., the Nyquist rate) is required to process the fastest data rate possible (i.e., the Nyquist data rate). Because CMOS hardware has lower clock rates than gallium arsenide (GaAs) hardware and therefore the fastest A/Ds, CMOS digital receivers employing traditional serial algorithms for digital communications process data rates approximately fifteen to twenty times lower than the Nyquist data rate.

With the evolution of high-speed satellite and terrestrial communications, the applications of high data rate communication systems are becoming abundant. Existing earth orbital satellites support data rates of several hundred megabits per second (Mbps). NASA's next generation Telecommunication and Data Relay Satellite System (TDRSS) will support data rates up to 800 Mbps. In addition, downlink data rates in excess of one giga-bits per second (Gbps) are planned in the next three years with even higher data rates to follow. Communication systems must today process faster and handle an ever rising data throughput. In addition, numerous modulation types are available and varying data rates are required, making great flexibility in receivers necessary.

Advances in GaAs have made processing rates in the gigahertz range possible. However, the widespread use of high-speed components is costly both in non-recurring engineering costs and reproduction costs. In addition GaAs VLSI requires far more power than CMOS based processors and is far less reliable. It is difficult to implement all of the functionality of a modern all-digital receiver for modern satellite communications on a single GaAs application specific integrated circuit (ASIC). A multiple ASIC solution is required due to the lower transistor density of GaAs. CMOS has much higher transistor density, far lower non-recurring engineering and reproduction costs than GaAs. In addition to being more reliable CMOS is more power efficient than GaAs, often making it more desirable for space-based applications.

The second limitation on maximum data rate in an all-digital receiver is due to the fact that the clock rates of CMOS are far lower than those of GaAs, and therefore far lower than the Nyquist data rate possible using commercially available analog-to-digital converters. Using traditional communications algorithms, the digital receiver has to process each sample at the input sampling rate. It would be desirable to develop parallel and multirate algorithms that allow all the traditional functions of a receiver to be performed within a single CMOS VLSI ASIC at the Nyquist data rate. This system-on-a-chip methodology reduces size and power requirements over a multiple ASIC solution as well as eliminates multiple expensive non-recurring engineering costs for each ASIC. This system requires that the data be processed at a rate that is fifteen to twenty times slower than the A/D rate.

Receivers are arguably the most complicated processing element (hardware or software) in a communications system. Modern digital receivers must be flexible to process many different modulation schemes, pulse shapes and data rates. Receiver complexity is directly related, although not necessarily linearly, to the complexity of the modulation type used in the system. Many modulations developed for wireless communication are complex, and are some so complicated that it is impractical to implement them in hardware. Modern modulation development is technologically ahead of hardware, both analog and digital implementations. This is particularly true of satellite communications systems operating at very high data rates.

With the rapid growth of VLSI technology coupled with the flexibility of digital signal processing algorithms, it is very desirable to implement receivers with as much digital processing as possible. In addition, an all-digital CMOS receiver has great improvements in size, reliability and greatly reduced reproduction costs over analog receivers. It should be noted that there is no such thing as an all-digital receiver, as there is always some analog processing (i.e., the analog-to-digital conversion).

The definition of an all-digital receiver is one such that the modulated data is sampled at some intermediate frequency (IF), and the receiver functions (e.g., demodulation to baseband, symbol detection (possibly matched filtering), carrier recovery, symbol timing recovery, and symbol to bit conversion) are done using exclusively digital processing. In addition, it is often desirable to have an equalizer structure that can eliminate either fixed or time-varying channel distortions using some minimum means-square error criteria. An equalizer can be an integral part of a receiver and greatly increase its performance.

As demand for information increases data rates will continue to increase. However, the usable spectrum to transmit this information is finite. More efficient use of this spectrum becomes necessary which will in turn require that more bandwidth efficient modulations be used for transmission. Some such modulations are many times more complex than those currently used in wireless systems. It is likely that previously developed but unimplemented modulations will be used and new modulations will be developed which will make more efficient use of the spectrum. Integral to the development of a very high rate wireless communications all-digital system is the use of bandwidth efficient modulation. With the increasing data rate requirements by NASA and private industry, more efficient use of spectrum is essential. Bandwidth efficiency of the wireless channel is the primary purpose for using bandwidth efficient modulations. Bandwidth efficient modulations are defined as all modulations, which are band-limited to a modulation symbol period-to-bandwidth product ($BT_{sym}$) equal to 2.0. The definition of band-limited being that at least 99.9% of the spectral energy of the modulation is contained in the passband. Bandwidth efficient modulations are necessary not only to make efficient use of channel spectrum, but also to minimize the Nyquist sampling rate for digital receivers which in turn maximizes the Nyquist data rate.

The cable modem industry has lead the field in terms of modulation complexity and bandwidth efficiency. However, a wireless system, particularly a satellite communications system generally has many different obstacles to overcome than a wire-based communications system. Satellite communications systems must generally incorporate sophisticated synchronization systems for carrier recovery and symbol timing recovery which are critical parts of receiver design and operation.

High order Quadrature Amplitude Modulation (QAM) and its numerous variations are used extensively in wire based systems and many terrestrial links. It is used in satellite communications links is limited. However, because of its bandwidth efficiency and bit-error rate performance for a given power, it is extremely likely this modulation type will see frequent use in future satellite communications systems. An example of this is the ARISE mission which requires an 8 Gbps down link using only 1.5 GHz of spectrum. The 32-QAM modulation with Nyquist pulse shaping (SRRC with roll-off factor =0.25) was determined to be the most efficient known modulation for an RF link which can reasonably be implemented.

The Nyquist data rate or near Nyquist data rate receiver will be developed for in-phase/quadrature-phase (I-Q) type modulations, M-ary PSK, and M-ary QAM because they appear to be the modulations of choice for most future high rate wireless satellite communications receivers. In addition, the receiver should use single-symbol detection filtering, as opposed to systems where symbol decisions are based on processing many symbols, such as maximum likelihood sequence detection.

Currently, 8-bit A/D converters exist which operate at rates as high as three giga-samples per second. Using band-limited Quadrature-Phase Shift Keyed (QPSK) modulation with bandwidth-symbol period product equal to 2.0 ($BT_{sym}$=2.0), an all-digital receiver requires a minimum of four samples per symbol. That is the symbol rate can be $3.0\times10^9/4=750\times10^6$ symbols per second. Recall that QPSK symbols represent two binary bits, the data rate of this system, the Nyquist data rate, is then $1.5\times10^9$ bits per second. The fastest all-digital QPSK CMOS receiver known operates at approximately seventy Mbps, or approximately twenty times slower than the Nyquist data rate! Numerous commercially available all-digital receivers operate near this rate and lower. This is approximately the fastest rate that can be accomplished in commercially CMOS ASICs using traditional serial communication processing algorithms. Relatively small improvements in speed can be accomplished by a full custom CMOS ASIC design.

It is reasonable to assume a sixteen order (tap) finite impulse response (FIR) filter, F(z), is used for the detection filter in both in-phase and quadrature-phase channels. In this system, F(z) will also remove the double frequency term created by the non-linear operation of mixing to baseband. This system would require $(16\times2+2)\times3\times10^9=102,000,000,000$ ($102\times10^9$) multiplications per second just to perform the matched filtering and digital down-conversion. There is much additional processing (multipliers, adders, etc.) required to implement a "real" receiver. This example clearly illustrates that other hardware implementations to achieve this Nyquist data rate, such as field programmable gate arrays (FPGAs), Digital Signal Processors (DSPs), are not feasible. CMOS ASICs cannot process these data rates without large parallelization. All of these technologies will continue to achieve higher processing rates in the future. However, GaAs A/D rates are also going to increase making the Nyquist data rate ever higher. This cycle may never stop, but it certainly does not appear to be the case in the foreseeable future. In addition, NASA's and IPL's data rate requirements are increasing at rates even beyond GaAs A/D rates, and the associated Nyquist data rate. Data rates of two to four Gbps are predicted in the 2002–2003 time frame, and data rates as high as forty-five Gbps are predicted by 2008. It is essential that an all-digital receiver capable of Nyquist data rates be implemented in order to make these type of data rates affordable and available to NASA scientists as well as commercial operations all over the world.

SUMMARY OF INVENTION

The present invention has been made in view of the above circumstances and has as an object to overcome the above problems and limitations of the prior art, and has a further object to provide high rate data demodulation for radio frequency data that is modulated by a variety of techniques.

Additional objects and advantages of the present invention will be set forth in part in the description that follows and in part will be obvious from the description, or may be learned by practice of the invention. The objects and advantages of the invention may be realized and attained by means of the instrumentalities and combinations particularly pointed out in the appended claims.

Accordingly, it is a general object of the present invention to provide a high rate data demodulation method and apparatus capable of overcoming the above and other problems associated with the prior art.

It is an object of the invention to provide a high rate data demodulator that is implemented as a CMOS ASIC.

It is a further object of the invention to provide a high rate data demodulator wherein the clock rate of the demodulator is one-quarter of the data rate, thereby meeting the Nyquist criteria.

It is a further object of the invention to provide a high rate data demodulator wherein symbol detection is performed in the frequency domain.

It is a further object of the invention to provide a high rate data demodulator for extracting a modulated data signal from a modulated data stream, comprising a mixer bank for multiplying a parallel format digital data stream by a signal equal in frequency to an intermediate frequency signal to produce a time domain digital data stream, a discrete Fourier transform circuit for converting the time domain digital data stream to a frequency domain digital data stream, a filter circuit for removal a double frequency component from the frequency domain digital data stream, a detection and recovery circuit for introducing frequency shift into the frequency domain digital data stream to eliminate phase shift in the time domain digital data stream, and an inverse discrete Fourier transform circuit for converting the frequency domain digital data stream to a time domain digital data stream, to recover the modulated data embodied within the modulated data stream.

It is a further object of the invention to provide a high rate data demodulator with a symbol recovery circuit to recover symbols from the time domain digital stream.

Still further, it is another object of the invention to provide a high rate data demodulator with a master controller that calculates and distributes filter weights and coefficients to the discrete Fourier transform circuit, the filter circuit, the detection and recovery circuit and inverse discrete Fourier transform circuit.

Still further, it is another object of the invention to provide a high rate data demodulator implemented as a CMOS ASIC that can be connected in a multiple configuration, so a first ASIC is the master demodulator and a second ASIC is the slave demodulator.

These and other objects of the present invention are accomplished by providing high rate data demodulators in a digital receiver configuration, wherein demodulators are provided for the in-phase and quadrature channels.

It is another object of the invention to provide a digital receiver configuration wherein an analog front-end, an analog-to-digital converter and a serial-to-parallel converter provide parallel format digital data stream for demodulation.

According to the present invention, the digital receiver can perform demodulation on a modulated data stream comprising BPSK-modulated data, QPSK-modulated data, differential power QPSK-modulated data,-offset QPSK-modulated data, or differential data rate QPSK-modulated data.

The above and other objects of the present invention are accomplished by providing a method for demodulating a data stream embodying a modulated data stream, whereby the modulated data stream is demodulated and the data recovered, by mixing a parallel format digital data stream by multiplication with a signal equal in frequency to an intermediate frequency signal to produce a time domain digital data stream, performing a discrete Fourier transform to convert the time domain digital data stream to a frequency domain digital data stream, filtering out the double frequency component from the frequency domain digital data stream, detecting any frequency shifts into the frequency domain digital data stream corresponding to phase shifts in the time domain digital data stream and introducing a frequency shift to offset the phase shift in the time domain digital data stream, and performing an inverse discrete Fourier transform to convert the frequency domain digital data stream to a time domain digital data stream, to recover the modulated data embodied within the modulated data stream.

BRIEF DESCRIPTION OF DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE INVENTION

A detailed description of the preferred embodiments of high data rate demodulators will now be given referring to the accompanying drawings.

The present invention is a high data rate demodulator that performs the filtering operations in the frequency domain by using the discrete Fourier transform (DFT) to compute linear convolution. By using this approach, symbol-timing correction can be implemented in the frequency domain, a process that has advantages over time-domain digital timing recovery.

The architecture of the present invention is based upon implementation of the lowpass and matched filters in the frequency domain via the DFT. In the time domain, matched filtering includes convolving a time-reversed version of the input received signal with the symbol pulse shape. Since convolution in the time domain corresponds to multiplication in the frequency domain, matched filtering can be performed in the frequency domain by multiplying the Fourier transform of the received signal by the Fourier transform of the pulse signal and then taking the inverse Fourier transform of the product. A lowpass filter can be added to this structure by simply zeroing out components of the product Fourier transform that correspond to stopband of the frequency domain lowpass filter.

Figure 1:
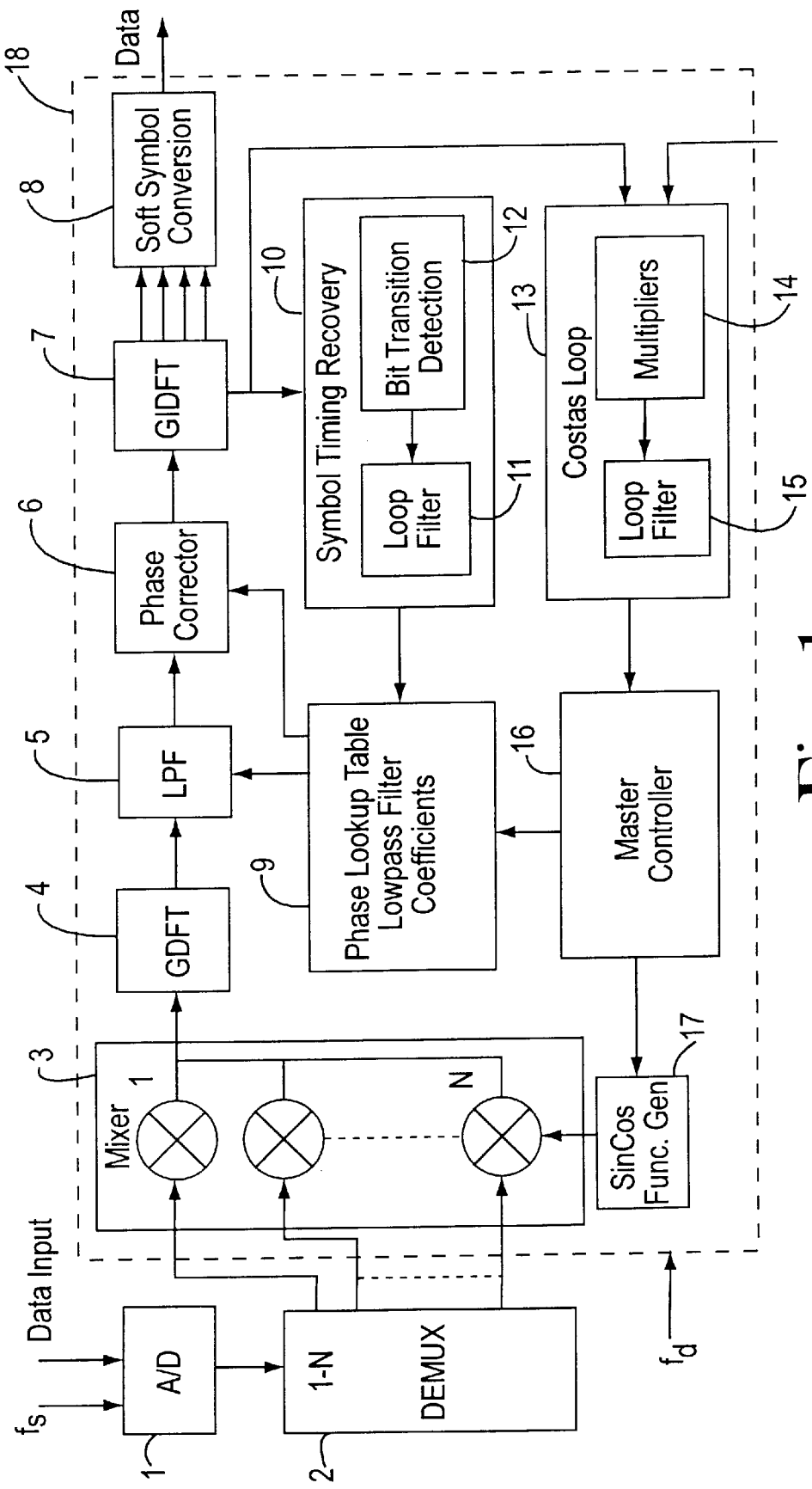
FIG. 1 depicts the preferred embodiment of the high rate digital demodulator.

Referring to FIG. 1, the preferred embodiment of the high data rate demodulator (HDRD) is shown and will be generally described. The A/D converter 1 and the serial to parallel converter 2 preprocess the modulated data coming into the HRDD 18. The digital mixer bank 3 receives the modulated data and mixes it with an intermediate carrier output by the sine-cosine function generator 17. The output of the digital mixer bank 3 is then passed to the GDFT module 4, where a DFT is performed on the output from the mixer bank 3. The GDFT module is connected to the lowpass filter 5 which filters the output from the GDFT module 4. The lowpass filter 5 outputs the filtered result to a phase corrector 6. Both the lowpass filter 5 and the phase corrector 6 receive their coefficients from a phase lookup/filter coefficients table 9, which is loaded by the master controller 16. The output of the phase corrector 6 is output to the GIDFT module 7, which performs an inverse DFT on the phase corrected data to demodulate the data. The GIDFT module 7 passes the demodulated data to the soft symbol converter 8, which extracts the symbols from the demodulated data.

The output of the GIDFT module 7 is also passed to the symbol timing recovery module 10 and a Costas loop filter 13. The symbol timing recovery module 10 consists of the loop filter 11 and a bit transition detector 12. The Costas loop filter 13 consists of the loop filter 15 and several multipliers 14. The output from the symbol timing recovery module 10 is passed to the phase lookup/lowpass filter coefficients table 9. The output of the Costas loop filter 13 is sent to the master controller 16. The master controller 16 selects coefficients from the phase lookup/lowpass filter coefficients table 9 for use in the low pass filter 5 and the phase corrector 6. The master controller 16 also controls the sine-cosine function generator 17, which supplies the intermediate frequency to be mixed with the modulated data in mixer bank 3.

Figure 2:
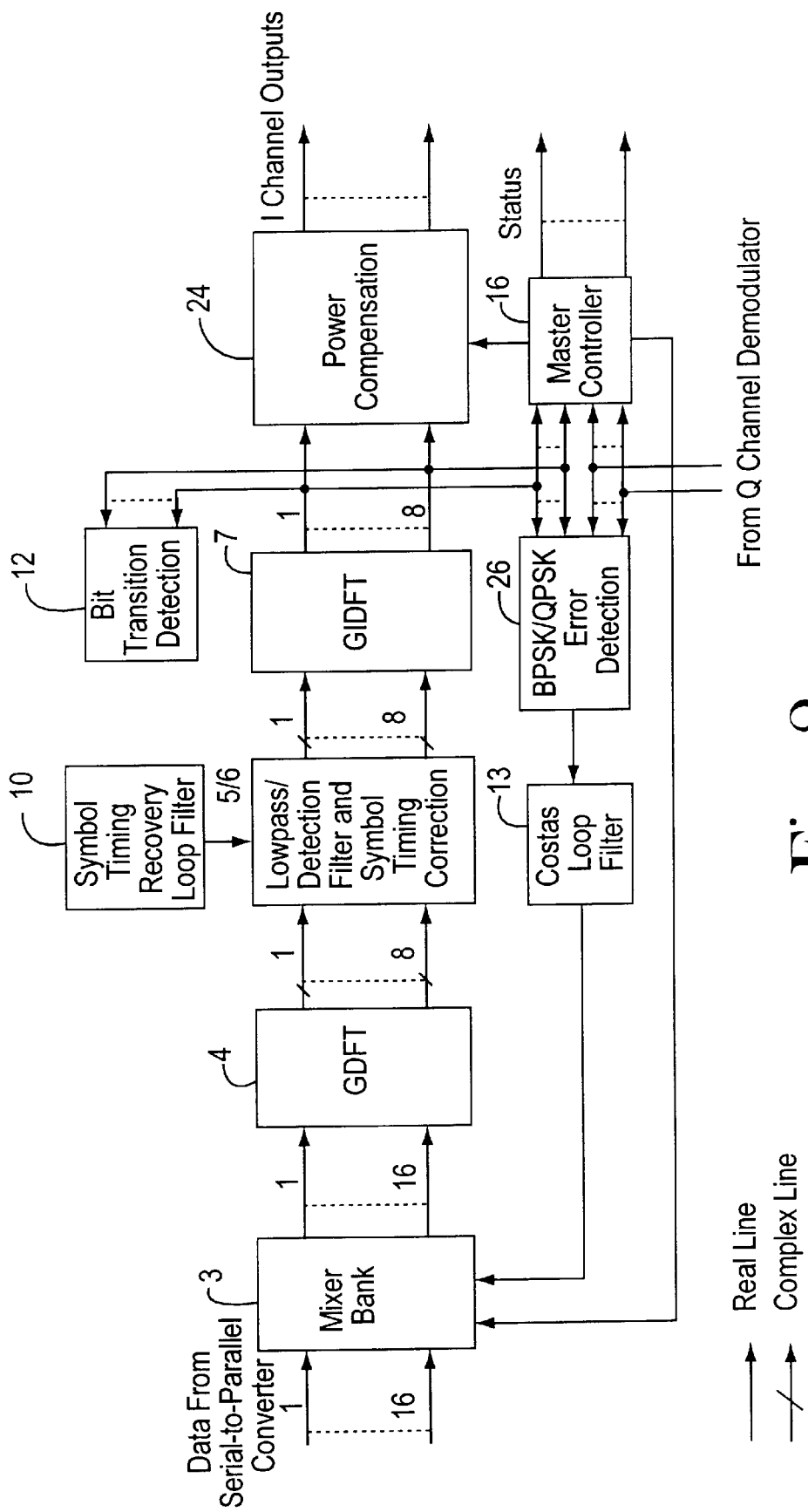
FIG. 2 depicts the preferred embodiment with power compensation algorithm and BPSK/QPSK error detection performed by the master controller.

Referring to FIG. 2, additional elements of the HRDD 18 are depicted. The master controller 16 further includes a power compensation algorithm with is depicted as a block (24) connected to the outputs from the GIDFT module 7. In addition, a BPSK/QPSK error detection algorithm is depicted as a block (26) interposed between the outputs of the GIDFT module 7 and the Costas loop filter 13.

Referring back to FIG. 1, prior to entering the HRDD 18, an intermediate stage down-converts the input radio-frequency data signal to an intermediate frequency that is appropriate for analog-to-digital conversion. The down-converted radio-frequency data signal is then passed through a bandpass filter (not shown) to reject noise and to limit the data bandwidth in order to prevent aliasing following the analog-to-digital conversion.

The filtered analog signal is then sampled by the analog-to-digital converter 1 at a rate of $f_s$→4W where W is the transmitted data rate and 2W=B is the bandwidth of the anti-aliasing filter. Note that $f_s$=4W is the Nyquist rate for bandpass sampling, and that the intermediate frequency must satisfy $f_{IF}$=(2k+1)W for some integer k. The present invention is currently designed to operate at four samples per symbol; therefore the maximum anti-aliasing filter bandwidth must be B=2/$T_{sym}$, where $T_{sym}$ is the symbol duration.

The anti-aliasing filter limits the bandwidth of the incoming data signal in order to prevent aliasing when sampling in the analog-to-digital conversion stage. Since the bandpass sampling occurs at the rate $f_s$=4W, aliasing will occur if the intermediate frequency bandwidth B is greater than B=2/$T_{sym}$, where $T_{sym}$. On the other hand, filtering the data spectrum causes intersymbol interference. Therefore, there is a tradeoff between the effects of aliasing and intersymbol interference: a larger $BT_{sym}$ filter causes more aliasing but less intersymbol interference, whereas a smaller $BT_{sym}$ causes less aliasing and more intersymbol interference. Furthermore, the order of the bandpass filter must also be considered, as lower order filters have a more gradual cutoff (resulting in more aliasing), while higher order filters have a sharper cutoff (resulting in more intersymbol interference). Based on analysis, a 10th order Type I Chebyshev bandpass filter with $BT_{sym}$=2 is recommended for the HRDD 18.

After the analog-to-digital conversion, the serial-to-parallel converter 2 coverts the sampled intermediate frequency signal into thirty-two parallel paths. The serial-to-parallel converter 2 also decimates each data path by sixteen. This decimation operation is required to create the data overlap necessary when using circular convolution.

Referring to FIG. 1, the operation of the digital mixer bank 3 will now is be described. After each of the parallel data paths has been decimated by sixteen, a digital mixer bank 3 mixes each data path with a copy of the intermediate frequency carrier, thereby producing double frequency terms in the data path. The resultant signal on each data path contains the baseband data plus this same data modulated onto a carrier which is twice the frequency of the original sampled carrier.

Paths seventeen through thirty-two contain identical information as paths one through sixteen on the previous iteration (clock cycle). This being known, it is not necessary to create paths seventeen through thirty-two. Therefore, in the HRDD 18, only sixteen parallel paths are actually calculated up to the input of the GDFT module 4. This parallelized signal is then passed through sixteen digital mixers of the digital mixer bank. The outputs of mixers one through sixteen, here again are identical to the outputs of mixers seventeen through thirty-two on the next iteration (clock cycle), if these values actually were calculated. If the HRDD is embedded within a digital receiver, this digital mixing process requires digital cosine and sine wave generation by the sine-cosine function generator 17, for the in-phase and quadrature-phase channels respectively, to multiply with the sampled modulated input.

The resultant signal on each path contains the baseband data plus this same data modulated onto a carrier which is twice the frequency of the original sampled carrier. This digital mixing operation is accomplished in a parallel fashion by using sixteen parallel sinusoid generators disposed within the sine-cosine function generator generating the same sinusoid samples that would be generated if the sinusoid were generated in a serial fashion. The signal containing the baseband data and the data modulated on twice the original frequency must be lowpass filtered in both channels to remove the data modulated on the double frequency term. This is accomplished in a parallel fashion by doing the lowpass filtering in the frequency domain. Therefore, following the digital mixing operation, the sixteen parallel paths of data are joined to the sequence of the sixteen outputs of the mixer bank from the previous iteration (clock cycle) on each channel and transformed to the digital frequency domain by a specialized 32-point discrete Fourier transform.

In the HRDD, the discrete Fourier transform, which is a sampled version of the discrete time Fourier transform, is used. Multiplication of two DFT sequences is, however, equivalent to circular convolution of the two time-domain sequences. In linear convolution, one sequence is linearly shifted with respect to the other in order to calculate an output value, whereas in circular convolution, the sequence is circularly shifted. In other words, circular convolution of two finite sequences corresponds to linear convolution of the infinitely periodic extensions of the two sequences. If two sequences of lengths L and M are circularly convolved, the resulting sequence of length max(L, M) contains min(L, M)−1 time-aliased values, i.e., the first min(L, M)−1 values do not agree with those that result from the linear convolution of the two sequences. Therefore, taking the inverse DFT of the product DFT sequences, only max(L, M)−min(L, M)+1 of the values are true linear convolution values. In the present invention, only these unaliased values are output, and the overlap and save method is used to provide all linear convolution values.

Referring to FIG. 1, the lowpass filter 5 will now be described in greater detail. The frequency domain lowpass filter acts as a detection filter for the baseband data at the output of the DFT. The necessary operation of this lowpass filter 5 is to remove the double frequency component due to the mixing operation. The simplest filter fulfilling this requirement for QPSK/BPSK modulation is one with the frequency components out of the DFT, representing these frequencies, being multiplied by zero. In fact, no matter what lowpass/detection filter is developed this will be a common characteristic in the design.

In the present invention, the DFT of the thirty-two data points is then taken and multiplied by the frequency domain representation of the matched filter. By parallelizing the digital intermediate frequency signal into thirty-two paths, but decimating only by sixteen, each DFT operates on sixteen points from the previous cycle along with sixteen new points.

Lowpass filtering in order to reject double frequency terms introduced by mixing in a copy of the intermediate frequency carrier is performed by zeroing out the middle sixteen components in the frequency domain, which correspond to the high frequency terms.

Figure 3:
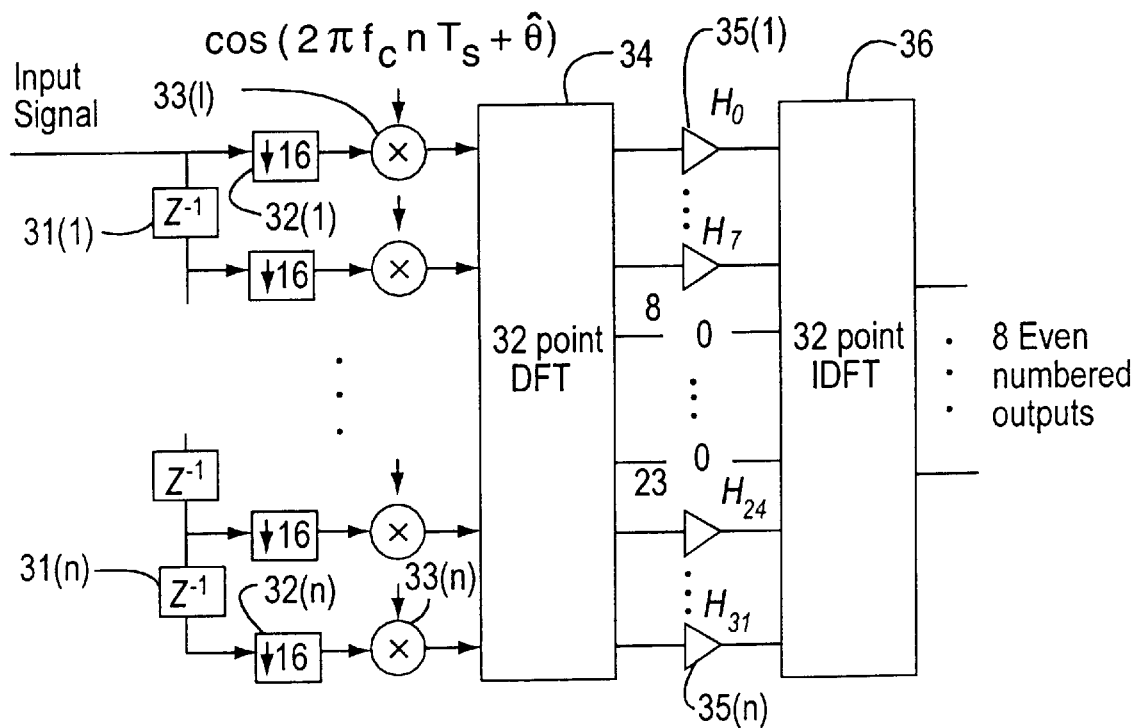
FIG. 3 illustrates the demodulation concept of the present invention.

In the present invention, the DFT does not calculate these frequencies in order to reject the double frequency components. That is, the positive and negative frequency pins out of the DFT representing the double frequency terms are not calculated. This corresponds to complex pins 8–23, as shown in FIG. 3. The lowpass/detection filter is then developed by taking the 32-point DFT of a single bit, then zeroing out the frequencies 8–23, as shown on FIG. 3. Another simplification for the DFT arises because the input signal to the digital demodulator is always real (not complex). The DFT of this signal has negative frequencies that are the complex conjugate of the positive frequencies. Utilizing this feature, the negative frequencies need not be calculated. Therefore, the DFT is only calculated for complex pins 0–7 of the DFT (refer to FIG. 3). The frequency domain signal coming out of the GDFT module 4 is then operated on by this low-pass/detection filter in a parallel fashion. That is, all of the data out of the GDFT module 4 is multiplied by the filter coefficients at the same time.

In a hardware implementation such as a CMOS ASIC, when frequencies are not calculated or referred to being zeroed out, this decreases the total gate count required because these operations are simply not performed nor do their outputs need to be stored.

Referring to FIG. 1, the GIDFT module 7 will now be described in greater detail. An inverse DFT (hereinafter "GIDFT") is performed on the remaining lowpass filtered frequency domain components, and the middle sixteen parallel outputs (which are unaliased and correspond to four symbol periods) are used for detection or tracking. This process is repeated once every sixteen analog-to-digital clock cycles. The sixteen points at the output of the GIDFT module 7 are sixteen samples of the convolution integral of the input sequence with the matched filter impulse response function. Among these sixteen samples are four peaks that correspond to the matched filter outputs of four symbols. By lowpass filtering in the frequency domain via zeroing of high frequency components, the resolution of the DFT is limited but this does not appear to induce any signal content loss. The length of the symbol pulse sequence is only four, so circular convolution with the thirty-two point data sequence should result in only three aliased points in the GIDFT module's output (neglecting the effect of the frequency domain lowpass filter). Therefore, more than sixteen values are available for use at the output of the GIDFT module 7. The present invention outputs, for implementation convenience, only sixteen output values, or four symbols, at a time.

Conventionally, the input to the inverse DFT would ordinarily be 32 complex samples. However, in the HRDD, the inverse DFT is modified so that only eight complex samples representing the positive frequencies are input and expanded internally to sixteen complex samples to introduce the negative frequencies.

Recall that the negative frequencies are the complex conjugate of the positive frequencies. Conventionally, the result of the inverse DFT of each channel would then be thirty-two parallel, filtered samples of the signal sampled by the analog-to-digital converter. The next clock cycle would generate the next thirty-two filtered samples and so on. However, many of the thirty-two samples (representing eight bits) are corrupted by aliasing from circular convolution. The number corrupted depends on the exact low-pass/detection filter used. However, the middle sixteen samples created by the 32-point inverse DFT have either no aliasing or an insignificant amount. Therefore, only sixteen samples of the inverse DFT are saved. By doing this process repetitively, the sampled input data is filtered in a piecewise fashion. Sixteen samples at a time are filtered due to the decimation by sixteen following parallelization, but with no discontinuities in the data. The output of the inverse DFT, when serialized, would be a filtered version of the sampled input to the demodulator with no breaks in the data. In the inverse DFT, only eight of the thirty-two outputs are calculated as the other twenty-four (eight at each end plus alternate outputs of the middle sixteen of the thirty-two parallel samples) are not needed.

If the HRDD was incorporated into a digital receiver, there are always sixteen valid samples being processed in parallel. That is, four information bits are being processed simultaneously and four information bits are output by the GIDFT module 7 on both the in-phase channel and the quadrature-phase channel on every clock cycle during QPSK demodulation. During BPSK demodulation, information bits are output of the in-phase channel with zero information coming out of the quadrature-phase channel.

The inverse DFT could calculate sixteen output samples, or four bits of information since there are four samples per bit. Since calculating symbol timing and decoding the binary bits from the sampled waveform only requires two samples per bit, at this point this is all that will be calculated. In other words, only eight samples are calculated at the output of the inverse DFT. These eight samples correspond to every other sample of the original sixteen. Since the bits have been filtered by a detection filter designed to approximate as nearly as practically possible a matched filter, the peak, or sample which represents the center point of the bit convolved with the matched filter, is used to determine whether or not the bit is a binary 1 (greater than zero) or a binary zero (less than 0). The problem is that this peak is moving with time in an asynchronous communications system. In other words, not only will the location of the peak not be known, but also the position of the peak will be changing with time.

The symbol timing recovery will now be discussed in greater detail. A shift in time in the time-domain corresponds to a shift in phase in the frequency domain. Symbol timing errors are really just the signal shifted in time from the ideal case. Symbol timing errors are corrected by introducing a phase shift in the frequency domain equal in magnitude and opposite in sign to the phase shift that corresponds to the time shift in the time-domain creating the symbol timing error. All that has to be done is convert the value of the calculated error which is linearly proportional to the timing error to an equivalent phase error and average and scale these values over long time averages to alleviate the affects of noise and oscillations created by the feedback control.

Because the signals that are being demodulated with the high rate digital receiver will be bandlimited, the baseband bit shape will be very similar to half a cycle of a sign wave, from 0 to 180 degrees for a binary 1, and 180 to 360 degrees for a binary 0. Under this approximation, the samples are 45 degrees apart. So with perfect symbol timing the first sample is 0 degrees, the second sample is 45 degrees and the third sample (peak) is the middle point of the sine wave, or 90 degrees, and the fourth sample is 135 degrees. The maximum symbol timing error is two samples or 90 degrees in phase. Again, a linear approximation will be used, that is two time samples corresponds to 90 degrees, one time sample corresponds to 45 degrees, and a fraction of a time sample is calculated similarly. Thus, the symbol timing error and sign are calculated by the bit transition detection block 12, filtered and scaled by an infinite impulse response feedback loop filter 11, the error is corrected by multiplying each output of the GDFT by a complex exponential with a phase opposite in sign but equal in magnitude to the estimated phase error.

In addition, this phase must be scaled to match the frequency represented by that output of the GDFT relative to the frequency used to calculate the phase error. The error is based on four samples per half cycle of a sine wave, or eight samples per cycle. The present invention accomplishes this task by scaling the complex exponentials implementing the phase shift to correct symbol timing by the appropriate lowpass/detection filter coefficient.

Determining the loop filter used is a matter of designing the filter using techniques for designing phased locked loop filters. This requires determining a bandwidth which is a function of signal-to-noise ratio of the data, and the scaling in the feedforward and feedback sections of the loop.

There are three aspects to symbol timing recovery: the error detection mechanism, and the error correction mechanism, and the averaging or loop filter. The error detection is based on the fact that when there is a bit transition, that is a 1 followed by a 0, or a 0 followed by a 1, if the peaks are located on the pins they should be, there will be one sample located exactly at the bit transition and that sample should be zero. If there is no bit transition between two peaks, the corresponding zero crossing is left out of the average. This is due to the fact that if there are no bit transitions, there is no way to detect the symbol timing error. If there is no symbol timing error, the value of the samples will be zero, and the peaks are located on the correct pins. If there is some error, these values will average to a constant that is proportional to the error. The average may be linearly proportional or proportional through a nonlinear transformation depending on the pulse shape and bandwidth available in the system. If the absolute value of the four zero crossings average to zero, there is no symbol timing error. If these four values average to their largest possible value, i.e., the peak, then the largest possible error is present. If these four values average to one-half the peak value, there is half the maximum symbol timing error. The maximum symbol timing error is two samples, half of the maximum symbol timing error is one sample, and one-fourth of maximum symbol timing error is one-fourth of a sample period.

In order to implement the detection filtering of the baseband signal, the data symbol boundaries need to be known. In a serial digital receiver, an accurate estimate of the symbol phase is needed to adjust the symbol clock so that the sum and dump operation is performed on the samples that correspond to the current symbol.

The solution to dealing with the sampling offset problem arises quite naturally when the frequency domain architecture of the present invention is used. In the time domain implementation, the estimated symbol delay $\delta$, which may not be an integer, is effectively truncated to an integer number of samples, since all the timing loop is doing in that case is to change the pin numbers used for deriving the data. The phase correction $e^{2\pi k\delta/32}$ that is applied to each frequency domain component k adjusts not only for the integer number of samples that the symbols are delayed by, but also for the fractional number of samples, which corresponds to the sampling offset. In other words, multiplying the N-point discrete Fourier transform of a sequence by $e^{2\pi k\delta/N}$ is equivalent to sampling a delayed version of the continuous time signal.

Referring to FIG. 1, in the present invention, carrier phase estimation and tracking is performed in a standard fashion, using a high signal-to-noise ratio Costas loop for suppressed carrier BPSK signals. For more detailed information on Costas loops, see S. Aguire and W. J. Hurd, *Design and Performance of Sampled Data Loops for Carrier and Subcarrier Tracking,* JPL TDA Progress Report, pgs. 42–79, (July–September 1984), which is incorporated herein by reference in its entirety for all it discloses.

The phase of the incoming sampled intermediate frequency must be determined so that this phase can be introduced in the in-phase channel and quadrature-phase channel mixer banks. The error is found by operating on the peaks of the in-phase and quadrature-phase channels. This error must then be scaled and averaged over a long time average to remove effects of noise and oscillations introduced in the feedback control, just as in the symbol timing recovery phased locked loop. Again, the design of the loop filter is dependent on bandwidth required and the scaling of the feed-forward and feedback portion of the phased locked loop.

Figure 4:
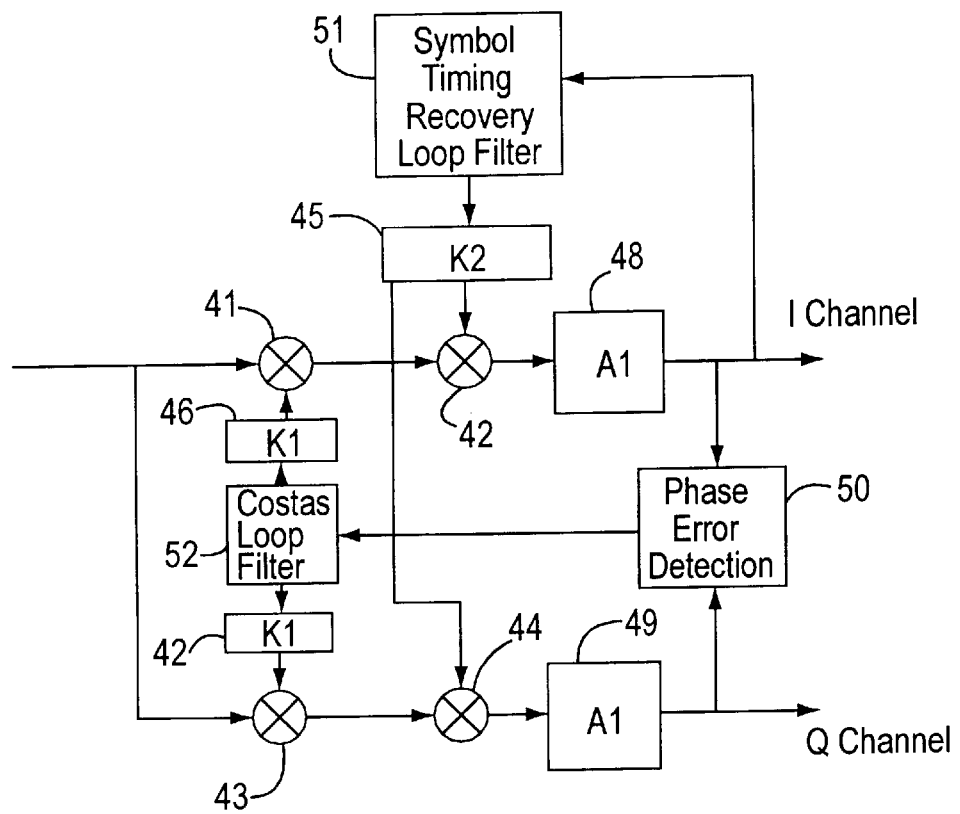
FIG. 4 illustrates a block diagram of the phase lock loops used for carrier phase tracking and symbol recovery.
Figure 5:
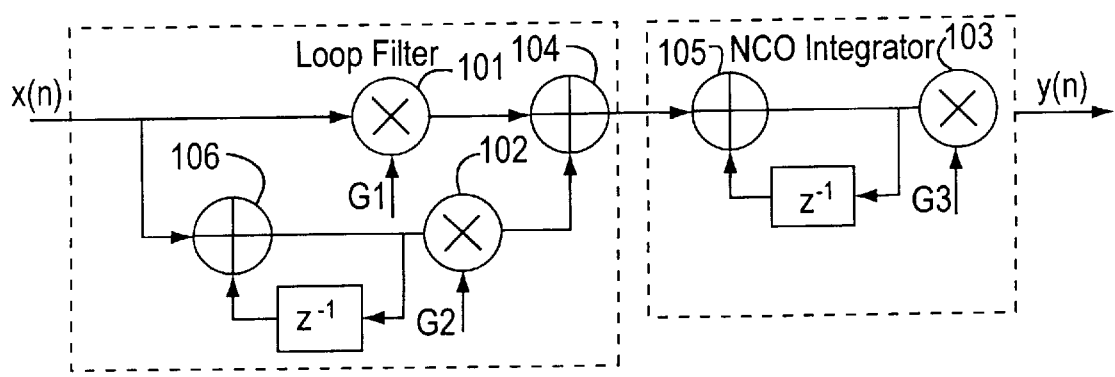
FIG. 5 illustrates a second order filter that is used for modeling carrier phase tracking and symbol recovery.

Referring to FIGS. 4 and 5, the design of the symbol-timing recovery and carrier recovery (Costas) phased locked loop filters will now be described in further detail. The design is accomplished by modeling the receiver in terms of it gain in the entire control path with mixers 41–44, filters 45–47 and amplifiers 48–49. In Equations (1) and (2), A1 represents the filter gain of the receiver and K1 represents the gain of the local oscillator of the Costas loop. The value r represents the digital damping ratio and the value $B_L$ represents the digital loop bandwidth.

$$(G1)(G3) = \frac{4r}{r+1} \frac{B_L}{(A1)(K1)} \qquad \text{Equation (1)}$$

$$(G2)(G3) = \frac{1}{T_1} = \left(\frac{4r}{r+1}\right)^2 \frac{B_L^2}{(A1)(K1)r} \qquad \text{Equation (2)}$$

The symbol-timing loop filter coefficients can be designed with the following design criteria as shown in Equations (3) and (4). The constant K2 represents the local oscillator gain of the symbol-timing recovery loop. As described above, the value r represents the digital damping ratio and the value $B_L$ represents the digital loop bandwidth.

$$(G1)(G3) = \frac{4r}{r+1} \frac{B_L}{(A1)(K2)} \qquad \text{Equation (3)}$$

$$(G2)(G3) = \left(\frac{4r}{r+1}\right)^2 \frac{B_L^2}{(A1)(K2)r} \qquad \text{Equation (4)}$$

In the embodiments, the default value of r is 2 and the default value of the digital loop bandwidth is 0.001. The linear filter gain of the high rate data demodulator is somewhat dependent on the data pattern, but assuming the input to the system (the output of the analog-to-digital converter) is ±0.8 (eighty percent of the analog-to-digital converter range being used) the output of the GIDFR is 65,536. In other words, the gain term A1 is 65,536. The Costas loop has a ten-bit sinusoid generator with gain K1=1/(1024) and the symbol-timing recovery loop with eight-bit sinusoid generator has gain K2=1/(256). Note that whenever the A1 changes new filter bandwidths are necessary.

Figure 6:
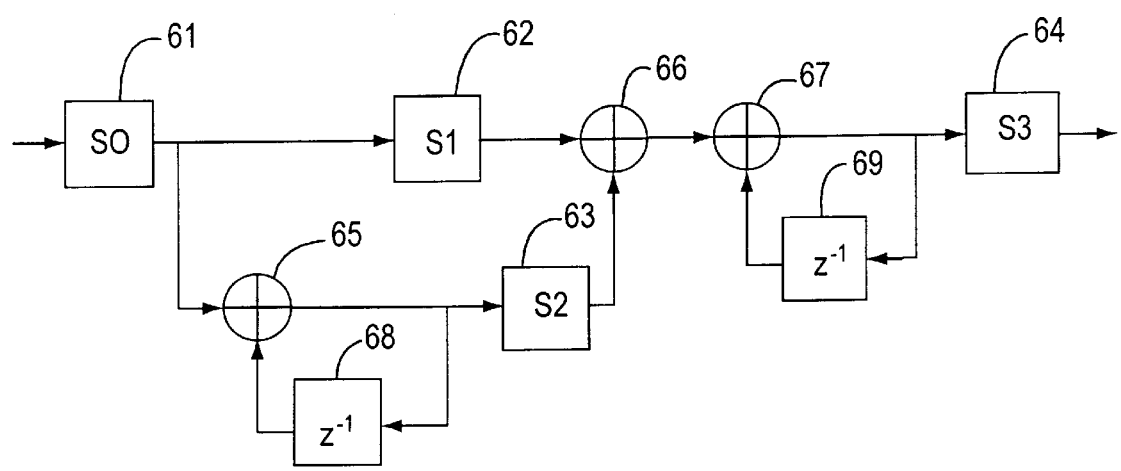
FIG. 6 illustrates a loop filter structure that is used by the Costas filter and the symbol recovery filter.

The Costas loop filter structure as shown in FIG. 6 has four coefficients (shifters) 61–64 that have to be programmed for proper operation. The master controller 16 handles this software task. These coefficients 61–64 are all powers of two and therefore correspond to either a left or right shift. Each coefficient 61–64 has a range of eight possible shifts. They are as follows:

S0=Left shift 0–7 bits
S1=Left shift 2–9 bits;
S2=Right shift 3–10 bits;
S3=Right shift 19–26 bits The following is a list of common bandwidths and their associated left and right shift values for the four multipliers 65–68 in the filter. The master controller 16 handles this software task. These numbers were generated assuming that eighty percent of the analog-to-digital (A/D) converter is being utilized in the digitalization process prior to the digital demodulator.

Bandwidth=0.00008 (2× Data Rate)
S0=000
S1=011
S2=110
S3=110
Bandwidth=0.0001 (2× Data Rate)
S0=000
S1=010
S2=110
S3=101
Bandwidth=0.0005 (2× Data Rate)
S0=000
S1=010
S2=011
S3=011
Bandwidth=0.001 (2× Data Rate)
S0=000
S1=011
S2=001
S3=011

The master controller module of the HRDD will now be described in greater detail. The master controller is responsible for setting up the HRDD for operation, as well as controlling the sine-cosine generators and loading/adjusting the various filter coefficients used by the GDFT module, the GIDFT module, the low pass filter and the phase corrector.

The master controller 16 also implements a BPSK/QPSK acquisition algorithm. The algorithm is always in one of two states. Either it is in the "acquisition state" where the carrier recovery digital phased-locked loop (DPLL) is out of phase and frequency lock, or it is in the "verification state" where the DPLL is in phase and the frequency locked. The algorithm is periodically verifying that the DPLL is in phase and the frequency locked. A lock detection signal is generated periodically and used for the verification. The user may specify that one, two, or three consecutive lock detection signals indicate the carrier recovery DPLL is in phase and frequency lock before the algorithm transitions from an acquisition to verification state. Likewise, the user may specify that one, two, or three consecutive lock detection signals indicate the carrier recovery DPLL is not in phase and frequency lock before the algorithm transitions from a verification state to an acquisition state. When the algorithm is in the acquisition state, it will choose one of two preprogrammed digital filters for the DPLLs. In the verification state, the second of the two preprogrammed digital filters will be chosen for the DPLLs. The algorithm generates power estimates of the power on the in-phase and quadrature channels which are used in the in-phase and quadrature power compensation. In addition, the algorithm provides these power estimates as well as other status to the user through status registers.

The master controller 16 also implements in-phase and quadrature channel power compensation when the HRDD is used in a digital receiver. The power compensation algorithms do nothing more than multiply each channel by a power of two up to eight which is determined by the master controller or preset by the user of the high rate digital demodulator. The master controller can multiply the output of the in-phase and quadrature channels by one, two, four or eight which is determined by a user defined setup parameter. This multiplication constant can be the same or different for the two channels. When demodulating differential-power QPSK modulated data, the algorithm determines which channel should be multiplied by which user-defined coefficient using the power estimates from the acquisition algorithm.

The master controller 16 also handles passing the filter weights used by the GDFT module 4. The lowpass/detection filtering is accomplished in the frequency domain by multiplying each complex output of the GDFT module 4 in the digital receiver by a specified weight. The default weights to be used for the digital receiver when modulating QPSK and BPSK modulated data and only the main load of the spectrum is being passed by a bandpass filter prior to the A/D are as follows: w0=1.0, w1=0.976, w2=0.898, w3=0.787, w4=0.629, w5=0.472, w6=0.299, and w7=0.142. Pin 1 out of the GDFT is multiplied by w1, the complex pin 2 is multiplied by w2, and so on. Each output of the GDFT is also passed through a phase shifting structure to accomplish symbol timing recovery. The weights w1 through w7 are applied in the phase shifting structure. The phase shifting structure for each pin (with the exception of pin 1, which has no phase) has a cosine and sine lookup table. The lookup table values are used to create the phase shift determined by the symbol timing recovery algorithm. The lowpass/detection filter is combined with the phase shifting structure by simply multiplying the appropriate weights by each value in the lookup table. Recall that each set of pins is a complex number output of the GDFT. These lookup tables can be generated by numerous methods in software.

Figure 7:
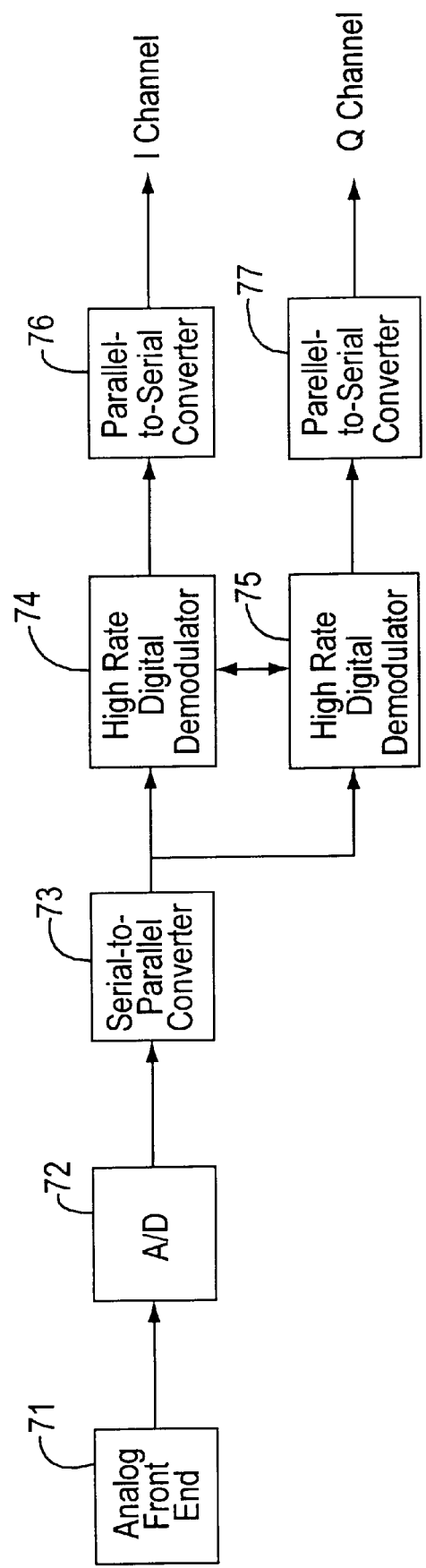
FIG. 7 illustrates a block diagram of the preferred embodiment of a receiver comprising the present invention that uses separate demodulators for in-phase and quadrature-phase data.

The use of an HRDD used in a digital receiver will now be described in greater detail. Referring to FIG. 7, the digital receiver comprises an analog front end 71. The analog front end 71 processes the modulated data stream as discussed above. The modulated data stream is then passed to the analog-to digital converter 72. Again, the operation of the analog-to-digital converter 72 has been described above, including its operational parameters. The sampled modulated data stream is then converted into parallel data streams by a serial-to-parallel converter 73. The parallel data streams are input into two HRDDs 74–75. One HRDD acts as the master HRDD, and the other acts as the slave. The outputs from each HRDD is input into parallel-to-serial converters 76–77 and output on separate in-phase and quadrature channels.

Figure 8:
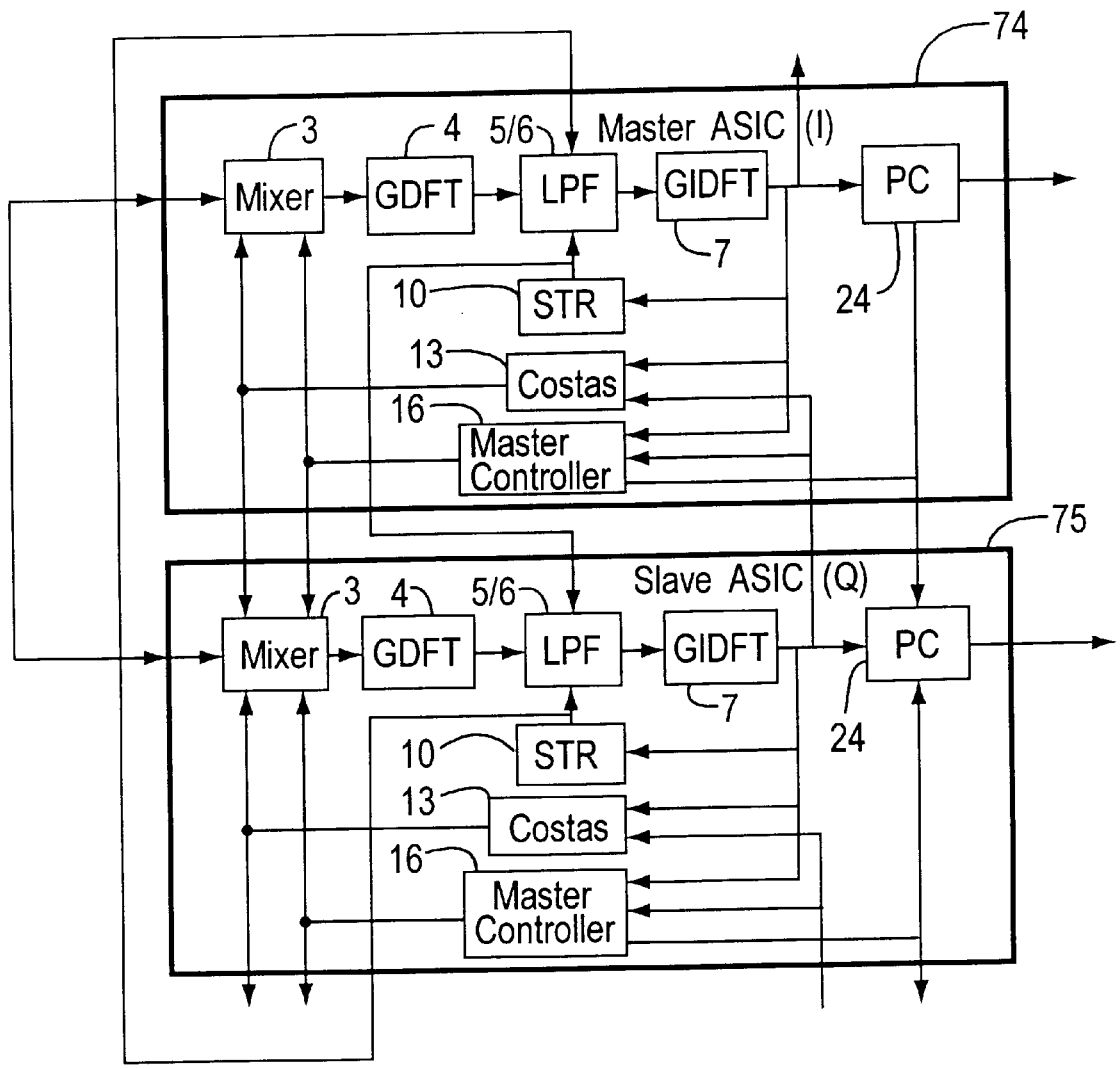
FIG. 8 illustrates a detailed block diagram of the preferred embodiment of the present invention that uses separate demodulators for in-phase and quadrature-phase data.

Referring to FIG. 8, the connection of two HRDDs in a digital receiver is shown. In a preferred embodiment for a digital receiver, the master ASIC 74 handles the in-phase data channel and the slave ASIC 75 handles the quadrature data channel. Depending upon the type of data demodulation required, the two HRDDs may share data from a single symbol timing recovery loop, Costas loop or a master controller.

There are many modes of operation for the digital demodulator embodied within a digital receiver for the many variations of BPSK and QPSK modulation that are used. Often there is more than one way to perform the necessary processing to demodulate received data. The two HRDD ASICs will be connected in a digital receiver in such a way that all modulation schemes can be demodulated by setting the appropriate software parameters. All of the modes listed below use a master ASIC 74 and slave ASIC 75 configuration. The master ASIC 74 contains the operating master controller and the Costas loop. The slave ASIC 75 receives master controller commands and the carrier recovery information from the master ASIC 74. The symbol timing recovery loop can be accomplished in either the master or slave depending on the type of modulation used. The master ASIC 74 which is the in-phase channel will have the cosine mixer bank and the demodulated bits will come out of this ASIC. The symbol timing recovery loop from the master channel must be used to control symbol timing in both the master and slave ASICs (in-phase and quadrature channels). The slave ASIC 75 contains the sine mixer bank and has no data coming out of it.

When performing QPSK demodulation, the master ASIC which is the in-phase channel will have the cosine mixer bank and the demodulated bits will come out of this ASIC. The symbol timing recovery loop from the master ASIC can be used to control symbol timing in both the master and slave ASIC's (in-phase and quadrature channels). The slave ASIC contains the sine mixer bank and has demodulated data coming out of it.

For offset QPSK demodulation, the same configuration as QPSK demodulation is used except an offset is entered into the slave ASIC which represents one half of a symbol (or 90 degrees) in the cosine and sine lookup tables used for symbol timing correction.

For differential power QPSK demodulation, the Master Controller chooses the symbol timing recovery loop output from the ASIC (channel) with the greatest power to control the symbol timing on both ASICs (channels).

For differential data rate QPSK, this mode requires two complete digital receivers, one for each channel. The two receivers are set up as BPSK receivers, one for the in-phase channel data rate and one for the quadrature channel data rate.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to is utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein. It is intended that the scope of the invention be defined by the claims appended hereto, and their equivalents.

What is claimed is:

1. A data demodulator for demodulating a modulated data stream, thereby extracting modulated data from the modulated data stream, including:

a mixer bank for multiplying a parallel format digital data stream by a signal equal in frequency to an intermediate frequency signal to create a time domain digital data stream;

a discrete Fourier transform circuit for converting the time domain digital data stream to a frequency domain digital data stream;

a filter circuit for removing a double frequency component from the frequency domain digital data stream;

a detection and recovery circuit for introducing frequency shift into the frequency domain digital data stream to eliminate phase shift in the time domain digital data stream; and an inverse discrete Fourier transform circuit for converting the frequency domain digital data stream to a time domain digital data stream, recovering the modulated data embodied within the modulated data stream.

2. The data demodulator as set forth in claim 1, further including a plurality of sinusoid generators for supplying the intermediate frequency signal to the mixer bank.

3. The data demodulator as set forth in claim 1, further including a controller circuit for controlling the mixer bank, the discrete Fourier transform circuit, the filter circuit, the detection and recovery circuit and the inverse discrete Fourier transform circuit.

4. The data demodulator as set forth in claim 1, wherein the controller circuit sets the filter weights used by the discrete Fourier transform circuit, the filter circuit, the detection and recovery circuit and the inverse discrete Fourier transform circuit.

5. The data demodulator as set forth in claim 1, wherein the high rate date demodulator is a CMOS ASIC.

6. The data demodulator as set forth in claim 1, wherein the mixer bank comprises at least 32 digital mixers.

7. The data demodulator as set forth in claim 6, wherein the discrete Fourier transform circuit performs a 32-point transform on the output from the mixer bank.

8. The data demodulator as set forth in claim 7, wherein the middle 16 channels from the 32-point discrete Fourier transform are set to zero.

9. The data demodulator as set forth in claim 7, wherein the inverse discrete Fourier transform circuit performs a 32-point transform on the output from the detection and recovery circuit.

10. The data demodulator as set forth in claim 1, wherein the filter circuit further comprises a lowpass filter to remove the double frequency component introduced by the mixer bank.

11. A method for demodulating a modulated data stream to recover the modulated data, including:

mixing a parallel format digital data stream by multiplication with a signal equal in frequency to an intermediate frequency signal to produce a time domain digital data stream;

performing a discrete Fourier transform to convert the time domain digital data stream to a frequency domain digital data stream;

filtering out a double frequency component from the frequency domain digital data stream;

detecting any frequency shifts into the frequency domain digital data stream corresponding to phase shifts in the time domain digital data stream and introducing a frequency shift to offset the phase shift in the time domain digital data stream; and performing an inverse discrete Fourier transform to convert the frequency domain digital data stream to a time domain digital data stream, to recover the modulated data embodied within the modulated data stream.

12. The method as set forth in claim 11, wherein a 32-point discrete Fourier transform circuit is performed on the output from the mixing step.

13. The method as set forth in claim 11, wherein the middle 16 outputs from the 32-point discrete Fourier transform are set to zero.

14. The method as set forth in claim 11, wherein a 32-point inverse discrete Fourier transform circuit is performed on the output of the frequency shift detection and recovery step.

15. The method as set forth in claim 11, further comprising the performance of low-pass filtering in order to remove a double frequency component introduced by the mixing of the parallel format digital data stream with a signal equal in frequency to the intermediate frequency signal.

16. An apparatus for processing a radio-frequency signal embodying a modulated data stream, comprising:

a converter circuit for down-converting the radio-frequency signal to an intermediate frequency signal embodying the modulated data stream;

an analog-to-digital circuit for sampling the intermediate frequency signal and creating a digital intermediate frequency signal embodying the modulated data stream;

a serial-to-parallel circuit for converting the digital intermediate frequency signal into a parallelized data stream embodying the modulated data stream;

an in-phase demodulator to recover the modulated data stream from the parallelized data stream, and outputting in-phase digital data from the modulated data stream in parallel format;

a parallel-to-serial circuit for converting the in-phase digital data from parallel format to serial format;

a quadrature-phase demodulator to recover the modulated data stream from the parallelized data stream, and outputting quadrature-phase digital data from the modulated data stream in parallel format;

a parallel-to-serial circuit for converting the quadrature-phase digital data from parallel format to serial format;

a power compensation circuit for boosting the output power of the in-phase digital data and quadrature-phase digital data from the in-phase demodulator and the quadrature-phase demodulator; and a controller circuit for controlling the in-phase demodulator, the quadrature-phase demodulator and power compensation circuit.

17. The apparatus as set forth in claim 16, wherein the intermediate frequency signal down-converted by the converter circuit is suitable for analog-to-digital conversion.

18. The apparatus as set forth in claim 16, wherein the converter circuit further comprises a bandpass filter for noise rejection.

19. The apparatus as set forth in claim 18, wherein the converter circuit further comprises a bandpass filter for anti-aliasing.

20. The apparatus as set forth in claim 16, wherein the digital-to-analog converter circuit samples the intermediate frequency signal at a rate at least four times greater than the data rate of the modulated data embodied within the radio-frequency signal.

21. The apparatus as set forth in claim 16, wherein the serial-to-parallel converter further comprises:

a circuit to convert the digitized intermediate frequency signal into at least 32 parallelized data streams; and a circuit to decimate each of the parallelized data streams by 16, to produce the decimated parallelized data streams that are useful for circular convolution.

22. The apparatus as set forth in claim 16, wherein the in-phase demodulator and the quadrature phase demodulator further comprise:

a first digital mixer for mixing a digital cosine signal with the decimated parallelized data stream, to produce an in-phase baseband data stream embodying the modulated data;

a circuit for performing a discrete Fourier transform to convert the in-phase baseband data stream into the frequency domain from the time domain;

a lowpass filter circuit to remove the doubled frequency component from the in-phase baseband data stream;

a symbol recovery circuit that detects symbol errors introduced into the frequency domain in-phase data stream by a time shift present in the time domain in-phase data stream, and injecting a phase shift in the frequency domain that is equal in magnitude and of opposite sign of the detected time domain phase shift;

a circuit for performing an inverse discrete Fourier transform to convert the in-phase baseband data stream into the time domain from the frequency domain; and a sampling circuit to determine the phase of the digitized intermediate frequency signal, and sending this phase information to the first digital mixer.

23. The apparatus as set forth in claim 16, wherein the in-phase demodulator and the quadrature-phase demodulator are CMOS ASICs.

24. The apparatus as set forth in claim 16, wherein the in-phase demodulator and the quadrature-phase demodulator each further include a plurality of sinusoid generators for supplying the intermediate frequency signal to the mixer bank.

25. The apparatus as set forth in claim 16, wherein the in-phase demodulator and the quadrature-phase demodulator each further include a controller circuit for controlling the mixer bank, the discrete Fourier transform circuit, the filter circuit, the detection and recovery circuit and the inverse discrete Fourier transform circuit.

26. The apparatus as set forth in claim 16, wherein the controller circuit sets the filter weights used by the discrete Fourier transform circuit, the filter circuit, the detection and recovery circuit and the inverse discrete Fourier transform circuit.

27. The apparatus as set forth in claim 16, wherein the in-phase demodulator is the master demodulator and the quadrature demodulator is the slave demodulator.

28. A method for processing a radio-frequency signal embodying a modulated data stream, whereby the modulated data stream is demodulated and the data recovered, comprising:

down-converting the radio-frequency signal to an intermediate frequency signal embodying the modulated data stream;

sampling the intermediate frequency signal and creating a digital intermediate frequency signal embodying the modulated data stream;

converting the digital intermediate frequency signal into a parallelized data stream embodying the modulated data stream;

demodulating the parallelized data stream to recover the modulated data stream, and outputting in-phase digital data from the modulated data stream in parallel format;

converting the in-phase digital data from parallel format to serial format;

demodulating the parallelized data stream to recover the modulated data stream, and outputting quadrature-phase digital data from the modulated data stream in parallel format;

converting the quadrature-phase digital data from parallel format to serial format; and performing power compensation by boosting the output power of the in-phase digital data and quadrature-phase digital data from the in-phase demodulator and the quadrature-phase demodulator.

29. A method as set forth in claim 28, wherein the demodulation is performed on a modulated data stream comprising BPSK-modulated data.

30. A method as set forth in claim 28, wherein the demodulation is performed on a modulated data stream comprising QPSK-modulated data.

31. A method as set forth in claim 28, wherein the demodulation is performed on a modulated data stream comprising differential power QPSK-modulated data.

32. A method as set forth in claim 28, wherein the demodulation is performed on a modulated data stream comprising offset QPSK-modulated data.

33. A method as set forth in claim 28, wherein the demodulation is performed on a modulated data stream comprising differential data rate QPSK-modulated data.

34. A method as set forth in claim 28, wherein the down-conversion of the radio-frequency signal results in an intermediate frequency signal suitable for digital sampling.

35. A method as set forth in claim 28, wherein the intermediate frequency signal is filtered to reject noise.

36. A method as set forth in claim 35, wherein the intermediate frequency signal is filtered to prevent anti-aliasing when undergoing digital sampling.

37. A method as set forth in claim 28, wherein the intermediate frequency signal is sampled at a rate at least four times greater than the data rate of the modulated data embodied within the radio-frequency signal.

38. A method as set forth in claim 28, wherein the serial format to parallel format conversion of the digitized intermediate frequency signal further comprises:

converting the digitized intermediate frequency signal into at least 32 parallelized data streams; and decimating each of the parallelized data streams by 16, to produce the decimated parallelized data streams that are useful for circular convolution.

39. A method as set forth in claim 28, wherein the in-phase demodulation further comprises:

mixing a digital cosine signal with the decimated parallelized data stream, to produce an in-phase baseband data stream embodying the modulated data;

performing a discrete Fourier transform to convert the in-phase baseband data stream into the frequency domain from the time domain;

removing the doubled frequency component from the in-phase baseband data stream;

detecting symbol errors introduced into the frequency domain in-phase data stream by a time shift present in the time domain in-phase data stream, and injecting a phase shift in the frequency domain that is equal in magnitude and of opposite sign of the detected time domain phase shift;

performing an inverse discrete Fourier transform to convert the in-phase baseband data stream into the time domain from the frequency domain; and sampling in-phase baseband data stream to determine the phase of the digitized intermediate frequency signal, and sending this phase information to used when mixing the parallelized data stream with the digital cosine signal.

40. A method as set forth in claim 28, wherein the quadrature-phase demodulator further comprises:

mixing a digital sine signal with the decimated parallelized data stream, to produce an quadrature-phase baseband data stream embodying the modulated data;

performing a discrete Fourier transform to convert the quadrature-phase baseband data stream into the frequency domain from the time domain;

removing the doubled frequency component from the quadrature-phase baseband data stream;

detecting symbol errors introduced into the frequency domain quadrature-phase data stream by a time shift present in the time domain quadrature-phase data stream, and injecting a phase shift in the frequency domain that is equal in magnitude and of opposite sign of the detected time domain phase shift;

performing an inverse discrete Fourier transform to convert the quadrature-phase baseband data stream into the time domain from the frequency domain; and sampling quadrature-phase baseband data stream to determine the phase of the digitized intermediate frequency signal, and sending this phase information to used when mixing the parallelized data stream with the digital sine signal.

* * * * *